United States Patent Office 3,483,193
Patented Dec. 9, 1969

3,483,193
5-NITROFURYL AND 5-NITROTHIENYL COMPOUNDS
Rudi Gall, Mannheim-Feudenheim, and Kurt Stach and Wolfgang Voemel, Mannheim, Germany, assignors to C. F. Boehringer & Soehne GmbH, Mannheim-Waldhof, Germany, a corporation of Germany
No Drawing. Filed June 29, 1966, Ser. No. 561,359
Claims priority, application Germany, July 2, 1965,
B 82,651
Int. Cl. C07 51/46; A01n 9/20
U.S. Cl. 260—240
7 Claims

ABSTRACT OF THE DISCLOSURE

New 5-nitrofuryl and 5-nitrothienyl compounds of the formula:

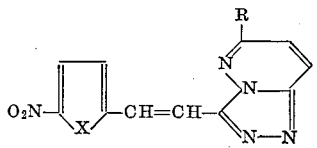

wherein X is a sulfur or oxygen atom and R is hydrogen, halogen, lower alkyl, alkoxy, alkylmercapto, or similar halo-substituted radicals, aryl, aralkyl, aralkoxy, aralkylmercapto, amino, hydroxy or mercapto, or similar acylated radicals have outstanding activity against pathogenic and non-pathogenic micro-organisms, e.g., Staph. aureus, E. coli, Pr. mirabilis, Ps. aeruginosa and Str. pyrogenes.

This invention comprises novel 5-nitrofuryl and 5-nitrothienyl compounds and the processes for making and using such compounds. More particularly, the invention relates to a new class of 5-nitrofuryl and 5-nitrothienyl compounds having the formula:

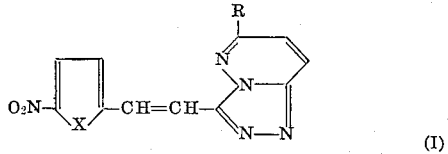
(I)

wherein X is a sulphur or oxygen atom and R is hydrogen, halogen, lower alkyl, alkoxy, alkylmercapto, or similar halo-substituted radicals, aryl, aralkyl, aralkoxy, aralkylmercapto and the like, or similar substituted radicals, or amino, hydroxyl or mercapto or similar acylated radicals.

The new compounds of this invention are useful chemotherapeutic agents particularly because of their outstanding action against pathogenic and non-pathogenic microorganisms, as, for instance, Staphylococcus aureus, Escherichia coli, Proteus mirabilis, Pseudomonas aeruginosa, and Streptococcus pyogenes.

The 5-nitrofuryl and 5-nitrothienyl compounds of this present invention can be prepared by the conventional methods and preferably are prepared by condensing a compound of the formula:

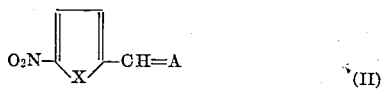
(II)

with an s-triazolo-[4,3-b]-pyridazine of the formula:

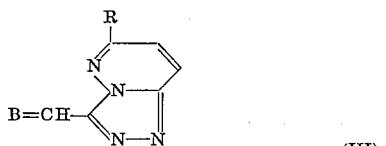
(III)

wherein X and R have the same significance as given above and one of the two substituents A and B designates an oxygen atom, while the other one designates two hydrogen atoms. The substituent R can, if desired, be introduced or liberated from a protective group following the condensation reaction.

A preferred process for preparing the new compounds of the present invention is by the reaction of 5-nitrofurfural or of 5-nitrothienylaldehyde with 6-R-3-methyl-s-triazolo-[4,3-b]-pyridazines. Some of the starting materials utilized in the foregoing reaction are known compounds but those which are new compounds can be prepared by a procedure analogous to that previously used for the preparation of the known compounds.

The reaction in accordance with the invention is carried out by heating the reaction components in the presence of suitable condensation agents and solvents. For this purpose, it is advantageous to use an excess of acetic anhydride or of glacial acetic acid.

In place of the s-triazolo[4,3-b]-pyridazines of Formula III, it is also possible to use hydrazino-pyridazines of the formula:

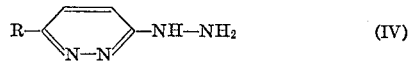
(IV)

in which R has the same significance as above, or acetyl derivatives thereof. These compounds cyclize immediately in the presence of the condensation agent, i.e., acetic anhydride or glacial acetic acid to give the triazolo compounds which, in turn, then react, according to the process of the present invention, with the 5-nitrofurfural or with the 5-nitrothienylaldehyde.

In certain instances it is expedient to introduce or liberate from a protective group the above-mentioned substituent R only after the condensation reaction has taken place. Thus, for example, the amino-substituted compounds are advantageously prepared by the saponification of the corresponding acylamino substituted compounds.

One of the aspects of the invention is to provide compositions containing 5-nitrofuryl and/or 5-nitrothienyl compounds in accordance with the invention for use in combating bacterial-induced disease or conditions. According to the invention, the novel 5-nitrofuryl and/or 5-nitrothienyl compounds may be associated with a carrier which may be either a solid material or a sterile parenteral liquid. The compositions may take the forms of tablets, powders, capsules, or other dosage forms, which are particularly useful for oral ingestion. Liquid diluents are employed in sterile condition for parenteral use, that is, by injection. Such a medium may be a sterile solvent, such as water; the compositions may take the form of the active material, namely, the 5-nitrofuryl or 5-nitrothienyl compound, admixed with solid diluents and/or tableting adjuvants, such as corn starch, lactose, talc, stearate talc, magnesium stearate, gums, or the like. Any of the tableting materials used in pharmaceutical practice may be employed where there is no incompatability with the 5-nitrofuryl or 5-nitrothienyl compound constituting the active agent. The material may be tableted with or without adjuvants. Alternatively, the 5-nitrofuryl or 5-nitrothienyl compound of the invention, with its adjuvant material, may be placed in the usual capsule or resorbable material, such as the usual gelatin capsule and administered in that form. In yet another embodiment, the novel 5-nitrofuryl or 5-nitrothienyl compound composition may be put up into powder packets and employed in that fashion. Or the composition may be prepared in the form of a suspension material in which the 5-nitrofuryl or 5-nitrothienyl compound is not soluble.

The percentage of active ingredients in the compositions may be varied. It is necessary that the active ingredient constitute a portion such that a suitable dosage will be obtained. Obviously, several unit dosage forms may be administered at about the same time.

The preparation of these compounds is more fully described in the following examples. It is to be understood however, that the examples are illustrative of the compounds embraced by this invention and of the methods for their preparation and are not to be construed as limiting the invention to the particular compounds or methods specifically described.

EXAMPLE 1

3-[2-(5-nitro-2-furyl)-vinl]-s-triazolo-[4,3-b]-pyridazine 1.3 g. 3-methyl-s-triazolo-[4,3-b] - pyridazine (M.P. 145–147° C.; which had been prepared from the corresponding 6-chloro compound (Chem. Abs., 50, 8655/1956) by catalytic hydrogenation or alternatively from 3-hydrazino-pyridazine (Bull. 1959, 1793) by cyclization with acetic anhydride) was heated for one hour at 150° C. with 1.5 g. 5-nitrofurfural and 4.7 ml. acetic anhydride. The reaction mixture following cooling was mixed with ether and the crystals which separated out were filtered off with suction. The yield amounted to 1.4 g. (56% of theory) of 3-[2-(5-nitro-2-furyl)-vinyl]-s-triazolo - [4,3-b]-pyridazine which, after recrystallization from dimethyl formamide, melted at 275° C. (decomp.).

The following compounds were prepared in an analogous manner:

6-hydroxy - 3 - [2-(5-nitro-2-furyl)-vinyl] - s - triazolo-[4,3-b]-pyridazine having an M.P. of 313° C. (decomp.), the Compound III which was used as starting material had a melting point of 255–257° C.

6-methoxy - 3 - [2-(5-nitro-2-furyl)-vinyl] - s - triazolo-[4,3-b]-pyridazine having an M.P. of 235–237° C. (decomp.), Compound III which was used as starting material had melting point of 166° C. (c.f. Chem. Abs., 50, 8655/1956);

6-methyl - 3 - [2-(5-nitro-2-furyl)-vinyl] - s - triazolo-[4,3-b]-pyridazine having an M.P. of 232–234° C. (decomp.) Compound III which was used as starting material melted at 121° C. (c.f. Chem. Abs., 55, 2323/1961);

6-phenyl - 3 - [2-(5-nitro-2-furyl)-vinyl] - s - triazolo-[4,3-b]-pyridazine having an M.P. of 252–256° C., Compound III which was used as starting material melted at 180° C.

EXAMPLE 2

6-amino-3-[2-(5-nitro-2-furyl)-vinyl]-s-triazolo-[4,3-b]-pyridazine 19.0 g. 3-methyl - 6 - acetamino-s-triazolo-[4,3 - b]-pyridazine (M.P. 268–270° C.) which had been prepared from the corresponding 6-chloro compound (Chem. Abs., 50, 8655/1956) by reaction with concentrated, aqueous ammonia solution in an autoclave at 100° C. followed by acetylation of the 6-amino compound obtained (melting point 300–302° C.), with acetic anhydride was heated for six hours at 100° C. with 16.9 g. 5-nitrofurfural and 47 ml. acetic anhydride. The cooled reaction mixture was then filtered with suction at room temperature and the material which was thereby obtained washed with alcohol. In this manner, there were obtained 20.6 g. (66% of theory) 6-acetamino-3-[2-(5-nitro - 2 - furyl)-vinyl]-s-triazolo - [4,3-b] - pyridazine which, following recrystallization from dimethylformamide, melted at 285–286° C. (decomp.).

6.9 g. of this acetamino compound were stirred for 1 hour at 100° C. with 70 ml. 6 N hydrochloric acid. The reaction mixture was then diluted with water, allowed to cool and filtered with suction. The residue was washed until neutral and then dried. In this manner, there were obtained 5.3 g. (89% of theory) of 6-amino-3-[2-(5-nitro 2-furyl)-vinyl]-s-triazolo-[4,3-b] pyridazine. After recrystallization from dimethylformamide, the compound had a decomposition point of 300° C.

EXAMPLE 3

6-amino-3-[2-(5-nitro-2-thienyl))-vinyl]-s-triazolo-[4,3-b]-pyridazine

A procedure analogous to that described in Example 2 was followed but the 5-nitrofurfural was replaced with an equivalent amount of 5-nitro-thiophene-2-aldehyde. There was recovered 6-acetamino - 3 - [2-(5-nitro - 2-thienyl) - vinyl] - s - triazolo - [4,3-b]-pyridazine having a melting point of 268–270° C. which could be saponified using hydrochloric acid to give 6-amino - 3 - [2-(5-nitro-2-thienyl) - vinyl] - s - triazolo - [4,3-b]-pyridazine having a melting point of 274–276° C. (decomp.).

The bacteriostatic activity of the compounds in accordance with the invention was evaluated in vitro with respect to the following organisms: *Staphylococcus aureus, Streptococcus pyogenes, Escherichia coli, Proteus mirabilis,* and *Pseudomonas aeruginosa.*

As comparison compounds, Furacin,[1] Furoxon,[2] and Furadantin[3] were employed. The absolute bacteriostatic minimal concentration in µg./ml. was determined for the three comparison compounds as well as for the following compounds of the invention:

(A) 6-methyl - 3-[2-(5-nitro-2-furyl)-vinyl]-s-triazolo-[4,3-b]-pyridazine (B) 3-[2 - (5 - nitro-2-furyl)-vinyl]-s-triazolo-[4,3-b]-pyridazine (C) 6-methoxy - 3 - [2-(5-nitro-2-furyl)]-vinyl-s-triazolo-[4,3-b]-pyridazine (D) 6-acetamino-3 - [2-(5-nitro-2-furyl)-vinyl]-s-triazolo-(4,3-b]-pyridazine (E) 6-amino-3-[2 - (5-nitro-2-furyl)-vinyl]-s-triazolo-[4,3-b]-pyridazine (F) 6-phenyl-3-[2-(5-nitro-2-furyl) - vinyl]-s-triazolo-[4,3-b]-pyridazine The results are set out in the following table:

BACTERIOSTATIC ACTIVITY

| Organism | Absolute bacteriostatic minimal concentration in µg./ml. | | | | | | | | |
|---|---|---|---|---|---|---|---|---|---|
| | A | B | C | D | E | F | Furacin | Furoxon | Furadantin |
| *Staphylococcus aureus*, SG 511 (12) | 0.25 | 0.25 | 0.25 | 0.125 | 0.016 | 0.125 | 8 | 1 | 8 |
| *Streptococcus pyogenes*, Aronson (75) | 0.25 | 0.5 | 0.25 | 0.062 | 0.008 | 0.25 | 4 | 8 | 4 |
| *Escherichia coli*, (18) | 0.031 | 0.031 | 0.031 | 0.031 | 0.004 | 0.125 | 8 | 0.25 | 8 |
| *Proteus mirabilis*, (298) | 4 | 2 | 4 | 1 | 0.25 | >16 | 128 | 64 | 256 |
| *Pseudomonas aeruginosa*, (71) | 2 | 0.5 | 16 | 2 | 0.5 | >16 | 128 | 64 | 256 |

The compounds in accordance with the instant invention are anti-microbials and have been found to be bactericidal to the pathogens found in surface infections, gram negative as well as gram positive. They additionally have utility as agents for routine treatment of acute and chronic bacterial infections of the urinary tract, including those caused by *Proteus sp.* Further they lend themselves because of their properties to use in the prevention or treatment of mixed surface infections of wounds, severe burns, cutaneous ulcers, pyodermas, osteomyelitis, preparation of wounds and burns for skin grafting and prevention of infection of grafts and donor sites.

The compounds of the invention can be employed in the form of aqueous solutions or suspensions thereof as, for instance, in the form of an 0.01 to 0.05% aqueous

---

[1] Trade name for nitrofurazone (5-nitro-2-furaldehyde semicarbazone—Eaton Laboratories, Norwich, N.Y.
[2] Trade name for furazolidone 3-(5-nitrofurfurylidene-amino)-2-oxazolidinone—Eaton Laboratories, Norwich, N.Y.
[3] Trade name of nitrofurantoin [N-(5-nitro-2-furfuryli-dene)-1-aminohydantoin]—Eaton Laboratories, Norwich, N.Y.

suspension or solution; in the form of solutions in non-aqueous hygroscopic liquid vehicles such as polyethylene glycol, for instance, 0.1–0.5% solutions in polyethylene glycol; incorporated into a water-soluble ointment-like base (concentration 0.1–0.5%) or in a powder base composed for instance of water-soluble polyethylene glycols (concentrations 0.1–0.5%) or in a form suitable for ingestion. Thus, a preferred form is a tablet containing 50–200 mg. of active compound. Depending on the condition, symptomatic and laboratory responses 100–400 mg. per day can be administered. Another preferred form for orally administering the compounds of the invention is in the form of a suspension thereof in a water-miscible flavored gel. Such a gel can contain from 1 to 10 mg. of compound per cc.

We claim:

1. A compound of the formula:

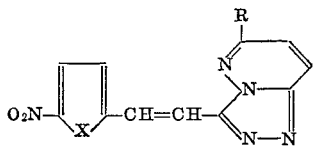

wherein X is selected from the group consisting of sulfur and oxygen atoms and R is selected from the group consisting of hydrogen, halogen, lower alkyl, lower alkoxy, lower alkylmercapto, halo substituted lower alkyl, halo substituted lower alkoxy, halo substituted lower alkylmercapto, phenyl, benzyl, benzyloxy, benzylmercapto, amino, hydroxy, mercapto, and acetamido.

2. 3[2-(5-nitro-2-furyl)-vinyl]-s-triazolo-[4,3-b]-pyridazine.

3. 6-methoxy-3-[2-(5-nitro-2-furyl)-vinyl]-s-triazolo-[4,3-b]-pyridazine.

4. 6-methyl-3-[2-(5-nitro-2-furyl)-vinyl]-s-triazolo-[4,3-b]-pyridazine.

5. 6-acetamino-3-[2-(5-nitro-2-furyl)-vinyl]-s-triazolo-[4,3-b]-pyridazine.

6. 6-amino-3-[2-(5-nitro-2-furyl)-vinyl]-s-triazolo-[4,3-b]-pyridazine.

7. 6-phenyl-3-[2-(5-nitro-2-furyl)-vinyl]-s-triozolo-[4,3-b]-pyridazine.

References Cited

UNITED STATES PATENTS

| | | | |
|---|---|---|---|
| 3,330,724 | 7/1967 | Van Essen et al. | 424—285 |
| 3,407,195 | 10/1968 | Snyder | 260—240 |

FOREIGN PATENTS 630,163 9/1963 Belgium.

JOHN D. RANDOLPH, Primary Examiner

U.S. Cl. X.R.

260—250; 424—250